(12) United States Patent
Fukushima et al.

(10) Patent No.: US 10,567,727 B2
(45) Date of Patent: Feb. 18, 2020

(54) REPRODUCTION METHOD, CREATION METHOD, REPRODUCTION DEVICE, CREATION DEVICE, AND RECORDING MEDIUM

(71) Applicant: Panasonic Intellectual Property Management Co., Ltd., Osaka (JP)

(72) Inventors: Toshiyuki Fukushima, Osaka (JP); Yasushi Uesaka, Hyogo (JP); Atsushi Ito, Osaka (JP); Kiyoaki Watanabe, Nara (JP); Toshiya Noritake, Osaka (JP); Kazuhiko Kouno, Osaka (JP); Yoshiichiro Kashiwagi, Kyoto (JP); Masayuki Kozuka, Osaka (JP); Yoshihiro Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/335,012

(22) PCT Filed: Sep. 25, 2017

(86) PCT No.: PCT/JP2017/034417
§ 371 (c)(1),
(2) Date: Mar. 20, 2019

(87) PCT Pub. No.: WO2018/062062
PCT Pub. Date: Apr. 5, 2018

(65) Prior Publication Data
US 2019/0253687 A1 Aug. 15, 2019

(30) Foreign Application Priority Data
Sep. 29, 2016 (JP) .................. 2016-191797

(51) Int. Cl.
*H04N 9/87* (2006.01)
*H04N 7/01* (2006.01)
*H04N 9/79* (2006.01)

(52) U.S. Cl.
CPC ............. *H04N 9/87* (2013.01); *H04N 7/01* (2013.01); *H04N 9/7925* (2013.01)

(58) Field of Classification Search
CPC ........... H04N 7/01; H04N 9/87; H04N 9/7925
(Continued)

(56) References Cited

U.S. PATENT DOCUMENTS 5,018,017 A  5/1991  Sasaki et al.
5,034,804 A  7/1991  Sasaki et al.
(Continued)

FOREIGN PATENT DOCUMENTS

| JP | 1-243686 | 9/1989 |
| JP | 2002-033953 A | 1/2002 |
| WO | 2015/194102 | 12/2015 |

OTHER PUBLICATIONS

International Search Report of PCT application No. PCT/JP2017/034417 dated Oct. 31, 2017.
(Continued)

*Primary Examiner* — Jefferey F Harold
*Assistant Examiner* — Mustafizur Rahman
(74) *Attorney, Agent, or Firm* — McDermott Will & Emery LLP

(57) ABSTRACT

A reproducing method includes: an obtaining step of obtaining a high quality image and a first low quality image that are still images showing an identical scene, and conversion determination information; a first determining step of determining whether or not the display device can display the high quality image; a first reproducing step of reproducing the high quality image when the display device can display
(Continued)

the high quality image; a second determining step of determining whether or not to generate a second low quality image by using the conversion determination information when the display device cannot display the high quality image; a second reproducing step of reproducing the first low quality image when it is determined not to generate the second low quality image; and a third reproducing step of generating the second low quality image from the high quality image and reproducing the second low quality image when it is determined to generate the second low quality image.

17 Claims, 10 Drawing Sheets

(58) Field of Classification Search
USPC .... 348/599, 441, 334, 396.1, 231.99, 231.2, 348/240.2, 687, 712
See application file for complete search history.

(56) References Cited

U.S. PATENT DOCUMENTS

| | | | | |
|---|---|---|---|---|
| 9,986,200 | B1* | 5/2018 | Tsai | H04N 21/435 |
| 2001/0008414 | A1* | 7/2001 | Kobayashi | A61B 1/0638 |
| | | | | 348/65 |
| 2010/0002080 | A1* | 1/2010 | Maki | G07C 5/0891 |
| | | | | 348/148 |
| 2011/0007188 | A1* | 1/2011 | Manabe | G06T 5/009 |
| | | | | 348/240.2 |
| 2012/0327303 | A1* | 12/2012 | Sun | G09G 3/3406 |
| | | | | 348/687 |
| 2013/0235159 | A1* | 9/2013 | Kim | H04N 21/23432 |
| | | | | 348/43 |
| 2014/0210847 | A1* | 7/2014 | Knibbeler | G09G 5/006 |
| | | | | 345/589 |
| 2015/0271355 | A1* | 9/2015 | Matsumoto | H04N 1/2112 |
| | | | | 348/231.2 |
| 2015/0281573 | A1* | 10/2015 | Sasaki | H04N 5/23229 |
| | | | | 348/231.99 |
| 2015/0341611 | A1* | 11/2015 | Oh | H04N 9/8722 |
| | | | | 386/230 |
| 2016/0080716 | A1* | 3/2016 | Atkins | H04N 5/44504 |
| | | | | 348/599 |
| 2016/0150180 | A1 | 5/2016 | Kozuka et al. | |
| 2016/0269676 | A1* | 9/2016 | Yamamoto | H04N 19/70 |
| 2016/0373712 | A1* | 12/2016 | Yamamoto | G11B 20/10 |

OTHER PUBLICATIONS

The Extended European Search Report dated Aug. 19, 2019 for the related European Patent Application No. 17856015.7.

* cited by examiner

FIG. 6

| | | |
|---|---|---|
| 114A | HDR image information | ・Maximum luminance  ・Center luminance<br>・D range<br>・Shooting mode<br>・Priority luminance range<br>・Shooting parameter<br>・View angle |
| 114B | SDR image information | ・View angle<br>・Parameter during conversion<br>・Generating device information |

114

REPRODUCTION METHOD, CREATION METHOD, REPRODUCTION DEVICE, CREATION DEVICE, AND RECORDING MEDIUM

CROSS-REFERENCE TO RELATED APPLICATIONS

This application is a U.S. national stage application of the PCT International Application No. PCT/JP2017/034417 filed on Sep. 25, 2017, which claims the benefit of foreign priority of Japanese patent application No. 2016-191797 filed on Sep. 29, 2016, the contents all of which are incorporated herein by reference.

TECHNICAL FIELD

The present disclosure relates to a reproducing method, a generating method, a reproduction device, a generating device, and a recording medium.

BACKGROUND ART

Patent Literature 1 discloses a technique of shooting a still image and recording data of the shot still image in a recording medium.

For example, a number of pixels of a shooting device such as a digital camera is increasing year by year. In recent years, there are shooting devices whose number of pixels exceeds 6 million, and shooting devices whose number of pixels exceeds 10 million. In this regard, resolutions of display devices such as television receivers (referred to as "televisions" below) that display moving images increase to 720× 480 pixels (approximately 340 thousand pixels of standard definition (SD), 1920×1080 pixels (approximately 2 million pixels and 2K images) of high definition (HD), and 3840× 2160 pixels (approximately 8 million 300 thousand pixels and 4K images), 4096×2160 pixels (approximately 8 million 850 thousand pixels and DCI4K) and 7680×4320 pixels (approximately 33 million 180 thousand pixels and 8K images) of ultra high definition (UHD). Thus, higher image quality of display devices is advancing.

As display devices (e.g., televisions) provide higher image quality, there are increasingly occasions that the display devices (e.g., televisions) display pictures (still images) shot by shooting devices (e.g., digital cameras).

Furthermore, a 4K image display technique and a dynamic range expansion technique are also proposed for display devices (e.g., televisions). More specifically, as a scheme of maintaining a dark tone, and expressing bright light such as specular reflection light that is difficult to express by current television signals as more actual brightness, a high dynamic range (HDR) technique (referred to as "HDR" below) is proposed.

CITATION LIST

Patent Literature

PTL 1: Unexamined Japanese Patent Publication No. H01-243686

SUMMARY

It is desired to effectively use this HDR for still images such as pictures. Furthermore, it is also desired that a conventional display device that does not support HDR can display moving images or still images of the HDR.

Furthermore, there is assumed a case where, even though a display device does not support HDR, a reproduction device such as a recorder supports the HDR. In this case, the reproduction device can preferably reproduce more suitable images on the display device connected to the reproduction device.

The present disclosure provides a reproducing method that can reproduce suitable images on a display device, a generating method, a reproduction device, a generating device or a recording medium.

A reproducing method according to one aspect of the present disclosure is a reproducing method for reproducing an image and outputting the reproduced image to a display device, and includes: an obtaining step of obtaining a high quality image and a first low quality image that are still images showing an identical scene, and conversion determination information; a first determining step of determining whether or not the display device can display the high quality image; a first reproducing step of reproducing the high quality image when the display device can display the high quality image; a second determining step of determining whether or not to generate a second low quality image by using the conversion determination information when the display device cannot display the high quality image; a second reproducing step of reproducing the first low quality image when it is determined not to generate the second low quality image; and a third reproducing step of generating the second low quality image from the high quality image and reproducing the second low quality image when it is determined to generate the second low quality image.

A generating method according to one aspect of the present disclosure includes: an obtaining step of obtaining RAW data; a first generating step of generating a high quality image that is a still image from the RAW data; a second generating step of generating from the RAW data a first low quality image showing a scene identical to a scene shown by the high quality image; and an outputting step of outputting the high quality image and the first low quality image, and outputting conversion determination information used by a reproduction device to determine whether the reproduction device (1) reproduces the first low quality image or (2) generates a second low quality image from the high quality image and reproduces the second low quality image when a display device connected to the reproduction device cannot display the high quality image.

A recording medium according to one aspect of the present disclosure has recorded thereon: a high quality image that is a still image; a first low quality image that shows a scene identical to a scene shown by the high quality image; and conversion determination information that is used by a reproduction device to determine whether the reproduction device (1) reproduces the first low quality image or (2) generates a second low quality image from the high quality image and reproduces the second low quality image when a display device connected to the reproduction device cannot display the high quality image.

A recording medium according to another one aspect of the present disclosure has recorded thereon: a high quality image that is a still image; and conversion determination information that is used by a reproduction device to determine whether or not the reproduction device generates a second low quality image from the high quality image and reproduces the second low quality image when a display device connected to the reproduction device cannot display the high quality image.

The present disclosure can provide a reproducing method that can reproduce a suitable image on a display device, a generating method, a reproduction device, a generating device or a recording medium.

BRIEF DESCRIPTION OF DRAWINGS

FIG. 6 is a view schematically illustrating a configuration example of conversion determination information according to the first exemplary embodiment.

DESCRIPTION OF EMBODIMENTS

Figure 1A:
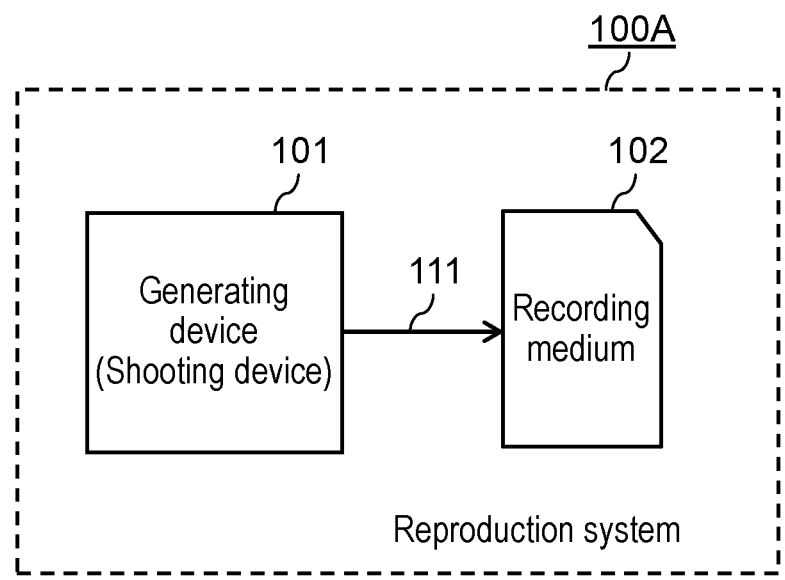
FIG. 1A is a view schematically illustrating a configuration example of a reproduction system according to a first exemplary embodiment.

A reproducing method according to one aspect of the present disclosure is a reproducing method for reproducing an image and outputting the reproduced image to a display device, and includes: an obtaining step of obtaining a high quality image and a first low quality image that are still images showing an identical scene, and conversion determination information; a first determining step of determining whether or not the display device can display the high quality image; a first reproducing step of reproducing the high quality image when the display device can display the high quality image; a second determining step of determining whether or not to generate a second low quality image by using the conversion determination information when the display device cannot display the high quality image; a second reproducing step of reproducing the first low quality image when it is determined not to generate the second low quality image; and a third reproducing step of generating the second low quality image from the high quality image and reproducing the second low quality image when it is determined to generate the second low quality image.

This reproducing method can determine whether to reproduce the first low quality image as is or to generate the second low quality image from the high quality image and reproduce the second low quality image by using the conversion determination information when the display device cannot display the high quality image. Consequently, the reproducing method can reproduce a suitable image on the display device that displays the reproduced image.

For example, according to the reproducing method, the conversion determination information may be information related to a luminance range of the high quality image.

According to this reproducing method, it can be determined whether or not to reproduce the second low quality image based on the luminance range of the high quality image.

For example, according to the reproducing method, the conversion determination information may be information of the first low quality image. In the second determining step, it may be determined whether or not to generate the second low quality image based on the conversion determination information and capability of the display device.

According to this reproducing method, it can be determined whether or not to reproduce the second low quality image based on information of the first low quality image.

For example, according to the reproducing method, the conversion determination information may be a parameter used to generate the first low quality image.

According to this reproducing method, it can be determined whether or not to reproduce the second low quality image based on the parameter used to generate the first low quality image.

For example, according to the reproducing method, the conversion determination information may be information related to shooting of the high quality image.

According to this reproducing method, it can be determined whether or not to reproduce the second low quality image based on the information related to shooting the high quality image.

For example, according to the reproducing method, the conversion determination information may indicate a shooting mode used to shoot the high quality image. In the second determining step, it may be determined to generate the second low quality image when the shooting mode is a predetermined shooting mode.

According to this reproducing method, it can be determined whether or not to reproduce the second low quality image based on the shooting mode used to shoot the high quality image.

For example, the reproducing method may further include a writing step of writing in a recording medium a parameter used to generate the second low quality image when it is determined to generate the second low quality image.

According to this reproducing method, a processing amount for reproducing the second low quality image again can be reduced.

A generating method according to one aspect of the present disclosure includes: an obtaining step of obtaining RAW data; a first generating step of generating a high quality image that is a still image from the RAW data; a second generating step of generating from the RAW data a first low quality image showing a scene identical to a scene shown by the high quality image; and an outputting step of outputting the high quality image and the first low quality image, and outputting conversion determination information used by a reproduction device to determine whether the reproduction device (1) reproduces the first low quality image or (2) generates a second low quality image from the high quality image and reproduces the second low quality image when a display device connected to the reproduction device cannot display the high quality image.

According to this generating method, the high quality image, the first low quality image and the conversion determination information are output. Consequently, the reproduction device that has obtained these images and the information can determine whether to reproduce the first low quality image as is or to generate the second low quality image from the high quality image and reproduce the second low quality image by using the conversion determination information when the display device connected to the reproduction device cannot display the high quality image. Consequently, the reproduction device can reproduce a suitable image on the display device connected to the reproduction device.

For example, according to the generating method, the conversion determination information may be information related to a luminance range of the high quality image.

According to this generating method, the reproduction device that has obtained the conversion determination information can determine whether or not to reproduce the second low quality image based on the luminance range of the high quality image.

For example, according to the generating method, the conversion determination information may be information of the first low quality image.

According to this generating method, the reproduction device that has obtained the conversion determination information can determine whether or not to reproduce the second low quality image based on the information of the first low quality image.

For example, according to the generating method, the conversion determination information may be a parameter used to generate the first low quality image.

According to this generating method, the reproduction device that has obtained the conversion determination information can determine whether or not to reproduce the second low quality image based on the parameter used to generate the first low quality image.

For example, according to the generating method, the conversion determination information may be information related to shooting of the high quality image.

According to this generating method, the reproduction device that has obtained the conversion determination information can determine whether or not to reproduce the second low quality image based on the information related to shooting of the high quality image.

For example, according to the generating method, the conversion determination information may indicate a shooting mode used to shoot the high quality image.

According to this generating method, the reproduction device that has obtained the conversion determination information can determine whether or not to reproduce the second low quality image based on the shooting mode used to shoot the high quality image.

A reproduction device according to one aspect of the present disclosure is a reproduction device that reproduces an image and outputs the reproduced image to a display device, and includes: an obtaining unit that obtains a high quality image and a first low quality image that are still images showing an identical scene, and conversion determination information; a determining unit that determines whether or not the display device can display the high quality image, and determines whether or not to generate a second low quality image by using the conversion determination information when the display device cannot display the high quality image; and a reproducer that (1) reproduces the high quality image when the display device can display the high quality image, (2) reproduces the first low quality image when it is determined not to generate the second low quality image, and (3) generates the second low quality image from the high quality image and reproduces the second low quality image when it is determined to generate the second low quality image.

According to this configuration, the reproduction device can determine whether or not the display device connected to the reproduction device can display the high quality image, and determine whether to reproduce the first low quality image as is or to generate the second low quality image from the high quality image and reproduce the second low quality image by using the conversion determination information when the display device cannot display the high quality image. Consequently, the reproduction device can reproduce suitable images on the display device connected to the reproduction device.

A generating device according to one aspect of the present disclosure includes: an obtaining unit that obtains RAW data; a first generator that generates a high quality image that is a still image from the RAW data; a second generator that generates from the RAW data a first low quality image showing a scene identical to a scene shown by the high quality image; and an output unit that outputs the high quality image and the first low quality image, and outputs conversion determination information used by a reproduction device to determine whether the reproduction device (1) reproduces the first low quality image or (2) generates a second low quality image from the high quality image and reproduces the second low quality image when a display device connected to the reproduction device cannot display the high quality image.

According to this configuration, the generating device outputs the high quality image, the first low quality image, and the conversion determination information. Consequently, the reproduction device that has obtained these images and the information can determine whether to reproduce the first low quality image as is or to generate the second low quality image from the high quality image and reproduce the second low quality image by using the conversion determination information when the display device connected to the reproduction device cannot display the high quality image. Consequently, the reproduction device can reproduce a suitable image on the display device connected to the reproduction device.

A recording medium according to one aspect of the present disclosure has recorded thereon: a high quality image that is a still image; a first low quality image that shows a scene identical to a scene shown by the high quality image; and conversion determination information that is used by a reproduction device to determine whether the reproduction device (1) reproduces the first low quality image or (2) generates a second low quality image from the high quality image and reproduces the second low quality image when a display device connected to the reproduction device cannot display the high quality image.

According to this configuration, the high quality image, the first low quality image and the conversion determination information are recorded in the recording medium. Consequently, the reproduction device that has obtained these images and the information can determine whether to reproduce the first low quality image as is or to generate the second low quality image from the high quality image and reproduce the second low quality image by using the conversion determination information when the display device connected to the reproduction device cannot display the high quality image. Consequently, the reproduction device can reproduce a suitable image on the display device connected to the reproduction device.

A recording medium according to another one aspect of the present disclosure has recorded thereon: a high quality image that is a still image; and conversion determination information that is used by a reproduction device to determine whether or not the reproduction device generates a second low quality image from the high quality image and reproduces the second low quality image when a display device connected to the reproduction device cannot display the high quality image.

According to this configuration, the high quality image and the conversion determination information are recorded in the recording medium. Consequently, the reproduction device that has obtained these images and the information can determine whether to generate the second low quality image from the high quality image and reproduce the second low quality image by using the conversion determination information when the display device connected to the reproduction device cannot display the high quality image. Consequently, the reproduction device can reproduce a suitable image on the display device connected to the reproduction device.

Those comprehensive or specific aspects may be implemented by a system, a method, an integrated circuit, a computer program or a recording medium such as a computer-readable recording medium such as a compact disc read only memory (CD-ROM), or may be implemented by any combination of the system, the method, the integrated circuit, the computer program, and the recording medium.

Exemplary embodiments will be more specifically described below with reference to the drawings. However, detailed descriptions that are more than necessary may be omitted. For example, the detailed description of an already known matter and the overlapping description of a substantially identical configuration may sometimes be omitted. Such omissions are made for avoiding excessive redundancy of the following description, and for helping those skilled in the art easily understand the following description.

The accompanying drawings and the following exemplary embodiments are provided for those skilled in the art to fully understand the present disclosure, and only indicate a specific example of the present disclosure. Numerical values, shapes, materials, constituent elements, arrangement positions and connection modes of the constituent elements, steps, and order of the steps shown in the following exemplary embodiments are merely examples, and therefore are not intended to limit the scope of the claims. Furthermore, among constituent elements in the following exemplary embodiments, a constituent element that is not described in an independent claim indicating a top concept will be described as an optional constituent element.

Each drawing is not exactly shown, but some of the drawings are schematic diagrams simplified as appropriate for the purpose of showing the present disclosure in an easily understood manner. In the respective drawings, substantially identical constituent elements are given identical reference numerals. Descriptions of those constituent elements may be omitted or simplified.

1. First Exemplary Embodiment

1-1. Configuration

First, a configuration of a reproduction system according to the present exemplary embodiment will be described.

Figure 1B:
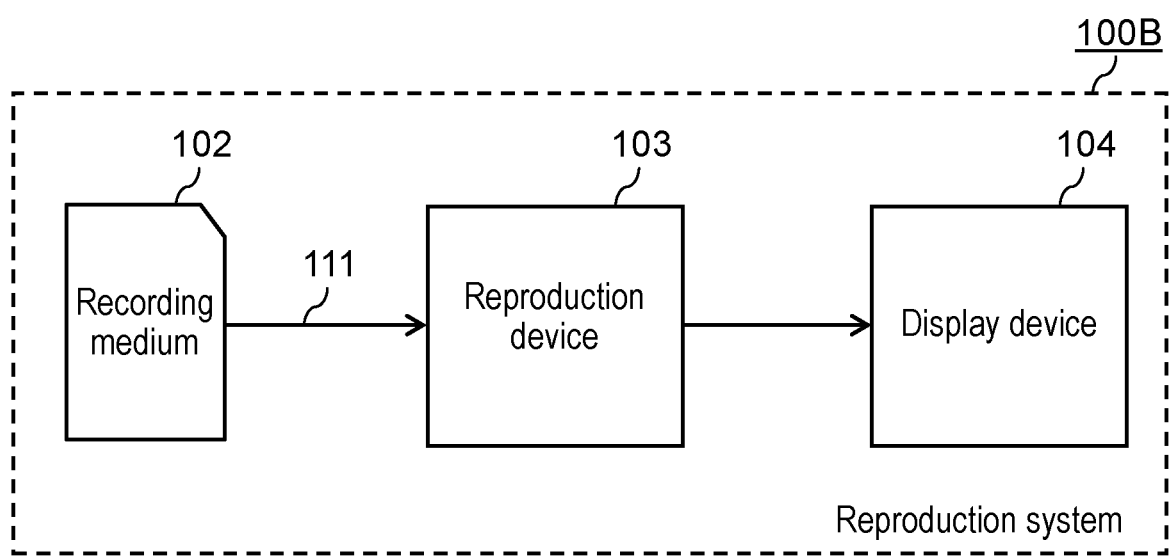
FIG. 1B is a view schematically illustrating a configuration example of the reproduction system according to the first exemplary embodiment.

FIGS. 1A and 1B are views schematically illustrating a configuration example of the reproduction system according to the first exemplary embodiment.

The reproduction system includes generating device 101, reproduction device 103, and display device 104. In addition, the present exemplary embodiment will describe the reproduction system separately as reproduction system 100A on a side of generating device 101, and reproduction system 100B on a side of reproduction device 103 for ease of description.

FIG. 1A schematically illustrates reproduction system 100A of the reproduction system on the side of generating device 101 including generating device 101 that generates image data 111 and records image data 111 in recording medium 102. FIG. 1B schematically illustrates reproduction system 100B of the reproduction system on the side of reproduction device 103 including reproduction device 103 that displays image data 111 recorded in recording medium 102 and display device 104.

Generating device 101 illustrated in FIG. 1A is a shooting device such as a digital video camera, a digital still camera, or a smartphone. Generating device 101 performs shooting to generate image data 111 that is a still image. In addition, generating device 101 may be an editing device that edits image data generated by a shooting device or the like.

As illustrated in FIG. 1A, generating device 101 records generated image data 111 in recording medium 102 such as a CompactFlash (CF) (registered trademark) card, a universal serial bus (USB) memory, or a secure digital (SD) memory card. When recording medium 102 having image data 111 recorded thereon is detached from generating device 101 and is connected to another device (e.g., reproduction device 103), image data 111 can be transmitted to this device (e.g., reproduction device 103).

A method for transmitting above image data 111 is merely an example in the present exemplary embodiment. In the present disclosure, the method for transmitting image data 111 is not limited to transmission via recording medium 102. For example, image data 111 may be transmitted via a recording medium such as an optical disk or a magnetic disk. For example, part or entirety of image data 111 may be transmitted from generating device 101 to another device (e.g., reproduction device 103) by wired communication or wireless communication. Furthermore, image data 111 may not be directly transmitted from generating device 101 to another device (e.g., reproduction device 103). For example, part or entirety of image data 111 may be transmitted from generating device 101 to another device (e.g., reproduction device 103) further via another equipment (e.g., a router or a server).

Reproduction device 103 illustrated in FIG. 1B is a reproduction device such as a Blu-ray (registered trademark) recorder or a Blu-ray (registered trademark) player. Reproduction device 103 displays on display device 104 an image obtained by reproducing image data 111. Display device 104 is, for example, a liquid crystal display device or an organic electro luminescence (EL) display device.

Figure 2A:
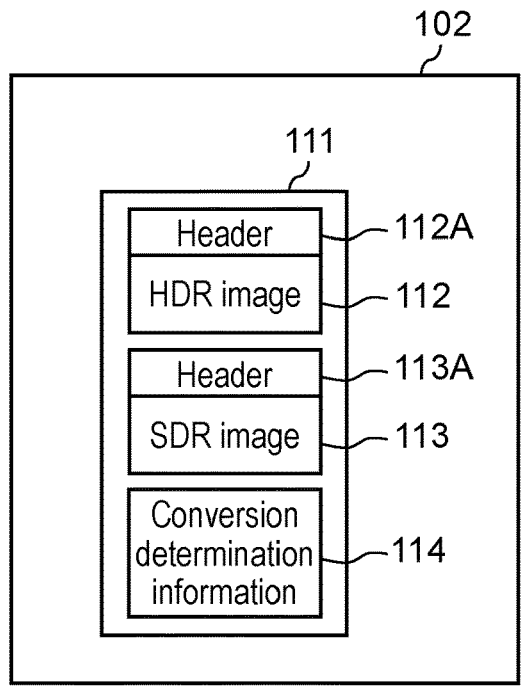
FIG. 2A is a view schematically illustrating a configuration example of image data according to the first exemplary embodiment.

FIG. 2A is a view schematically illustrating a configuration example of image data 111 according to the first exemplary embodiment.

Figure 2B:
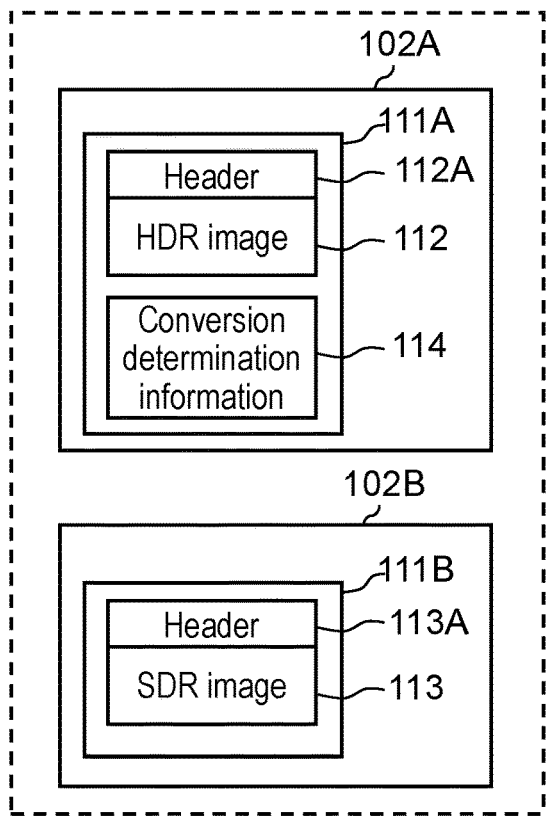
FIG. 2B is a view schematically illustrating a configuration example of image data according to the first exemplary embodiment.

FIG. 2B is a view schematically illustrating another configuration example of image data 111 according to the first exemplary embodiment.

In this regard, FIG. 2A illustrates the example where image data 111 is recorded in one recording medium 102. FIG. 2B illustrates the example where image data 111 is divided into image data 111A and image data 111B and is recorded in two of recording medium 102A and recording medium 102B.

As illustrated in FIG. 2A, image data 111 includes HDR image 112, standard dynamic range (SDR) image 113, and conversion determination information 114. Alternatively, as illustrated in FIG. 2B, image data 111A includes HDR image 112 and conversion determination information 114, and image data 111B includes SDR image 113.

HDR image 112 is image data (HDR image data) of a still image that supports an HDR, and is given header 112A. SDR image 113 is image data (SDR image data) of a still image that supports an SDR, and is given header 113A. Furthermore, a luminance range (dynamic range) of HDR image 112 is wider than a luminance range (dynamic range) of SDR image 113. More specifically, a maximum luminance of HDR image 112 is higher than a maximum luminance of SDR image 113.

Conversion determination information 114 is information for determining whether reproduction device 103 (1) reproduces HDR image 112, (2) reproduces SDR image 113, or (3) generates converted SDR image 132 from HDR image 112 and reproduces converted SDR image 132.

In addition, FIG. 2A illustrates conversion determination information 114 as individual information in addition to header 112A and header 113A. However, conversion determination information 114 may be included in header 112A or header 113A.

Furthermore, FIG. 2A illustrates the example where HDR image 112, SDR image 113 and conversion determination information 114 are recorded as one image data 111 in recording medium 102. However, at least part of HDR image 112, SDR image 113 and conversion determination information 114 may be recorded as individual data in another recording medium 102.

In addition, FIG. 2B illustrates the example where image data 111A including HDR image 112 and conversion determination information 114 is recorded in one recording medium 102A, and image data 111B including SDR image 113 is recorded in another one recording medium 102B.

Next, a configuration of generating device 101 will be described.

Figure 3:
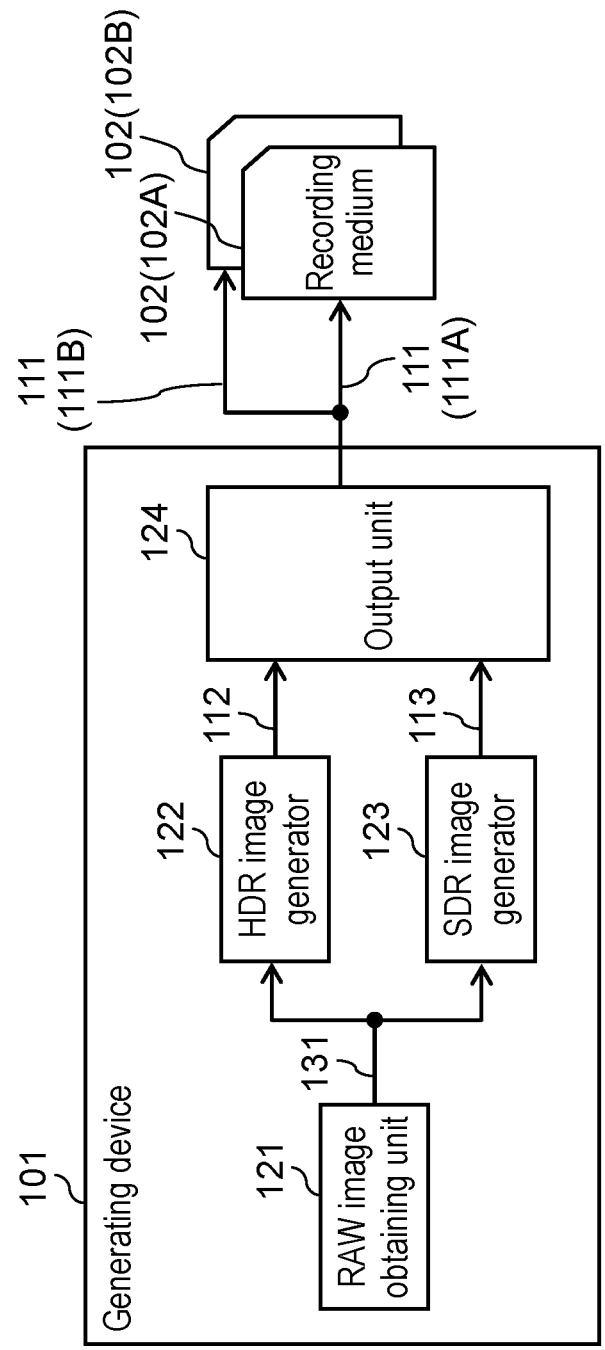
FIG. 3 is a block diagram schematically illustrating a configuration example of a generating device according to the first exemplary embodiment.

FIG. 3 is a block diagram schematically illustrating the configuration example of generating device 101 according to the first exemplary embodiment.

As illustrated in FIG. 3, generating device 101 includes RAW image obtaining unit 121, HDR image generator 122, SDR image generator 123 and output unit 124.

In addition, the constituent elements illustrated in FIG. 3 are part of constituent elements of generating device 101. FIG. 3 does not illustrate other constituent elements such as a power supply circuit.

RAW image obtaining unit 121 is, for example, a shooting unit. RAW image obtaining unit 121 shoots a still image to obtain (generate) RAW data 131 of the still image.

HDR image generator 122 performs color correction (grating) on RAW data 131 to generate HDR image 112. For example, HDR image generator 122 generates 10-bit HDR image 112 from RAW data 131 by using an HDR-Electro Optical Transfer Function (HDR-EOTF).

SDR image generator 123 generates SDR image 113 from RAW data 131. For example, SDR image generator 123 generates 8-bit SDR image 113 from RAW data 131 by using an SDR-EOTF.

In addition, numbers of bits of above-described HDR image 112 and SDR image 113 are merely exemplary. The numbers of bits of HDR image 112 and SDR image 113 in the present disclosure are by no means limited to the above-described numbers of bits.

Output unit 124 outputs image data 111 including HDR image 112 and SDR image 113. Furthermore, output unit 124 records image data 111 in one recording medium 102. Alternatively, output unit 124 may divide image data 111 into a plurality of items of image data (e.g., image data 111A and image data 111B), and record a plurality of items of image data in a plurality of recording media 102 (e.g., recording medium 102A and recording medium 102B), respectively.

In addition, output unit 124 may output HDR image 112 and SDR image 113 as individual data. Furthermore, output unit 124 may convert each of HDR image 112 and SDR image 113 into a predetermined image format, and package each of HDR image 112 and SDR image 113 according to the predetermined image format. Furthermore, output unit 124 may compress and encode each of HDR image 112 and SDR image 113 or image data 111.

Next, a configuration of reproduction device 103 will be described.

Figure 4:
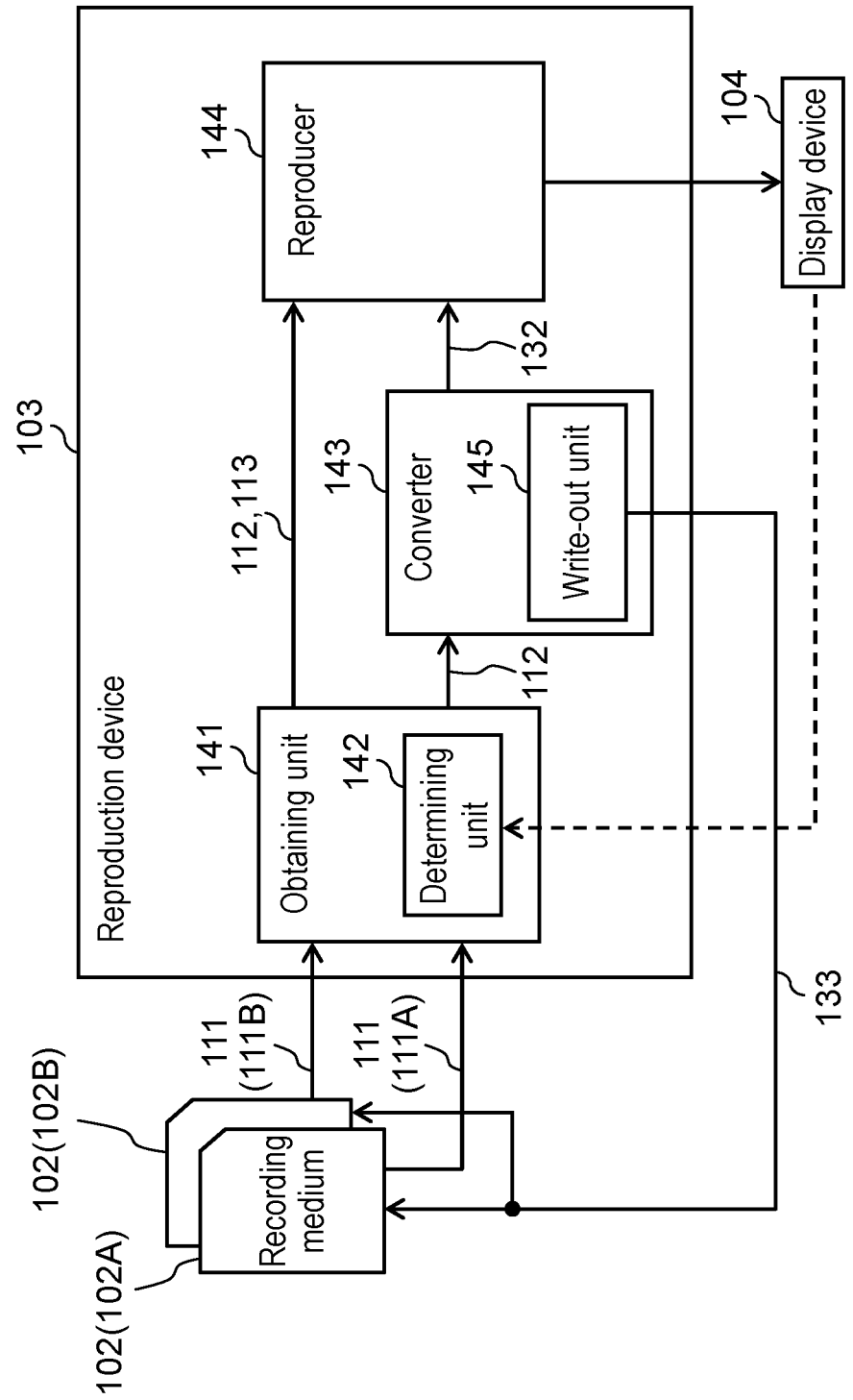
FIG. 4 is a block diagram schematically illustrating a configuration example of a reproduction device according to the first exemplary embodiment.

FIG. 4 is a block diagram schematically illustrating the configuration example of reproduction device 103 according to the first exemplary embodiment.

As illustrated in FIG. 4, reproduction device 103 includes obtaining unit 141, determining unit 142, converter 143, reproducer 144, and write-out unit 145.

The constituent elements illustrated in FIG. 4 are part of constituent elements of reproduction device 103. FIG. 4 does not illustrate other constituent elements such as a power supply circuit.

In addition, FIG. 4 illustrates recording medium 102 that provides image data 111 to reproduction device 103, and display device 104 that displays an image signal obtained when reproduction device 103 reproduces image data 111.

In addition, FIG. 4 illustrates recording medium 102A that provides image data 111A to reproduction device 103, and recording medium 102B that provides image data 111B to reproduction device 103. However, image data 111 may be provided from one recording medium 102 to reproduction device 103.

In addition, in the present exemplary embodiment, recording medium 102A and recording medium 102B will be collectively referred to as recording medium 102, and image data 111A and image data 111B will be collectively referred to as image data 111. That is, in the present exemplary embodiment, recording medium 102 may be single recording medium 102 or may include recording medium 102A and recording medium 102B. Furthermore, image data 111 may be single image data 111 or may include image data 111A and image data 111B.

Obtaining unit 141 obtains image data 111 from recording medium 102.

Determining unit 142 determines whether (1) to reproduce HDR image 112, (2) to reproduce SDR image 113, or (3) to generate converted SDR image 132 from HDR image 112 and reproduce converted SDR image 132.

When determining unit 142 determines (1) to reproduce HDR image 112, reproducer 144 reproduces HDR image 112 output from obtaining unit 141. When determining unit 142 determines (2) to reproduce SDR image 113, reproducer 144 reproduces SDR image 113 output from obtaining unit 141.

When determining unit 142 determines (3) to generate converted SDR image 132 from HDR image 112 and reproduce converted SDR image 132, converter 143 generates converted SDR image 132 from HDR image 112, and reproducer 144 reproduces converted SDR image 132 output from converter 143. Thus, reproducer 144 reproduces one of HDR image 112, SDR image 113 and converted SDR image 132.

Write-out unit 145 writes in recording medium 102 additional data 133 such as a parameter used to generate converted SDR image 132 by converter 143.

1-2. Operation

Next, an operation of reproduction device 103 will be described.

Figure 5:
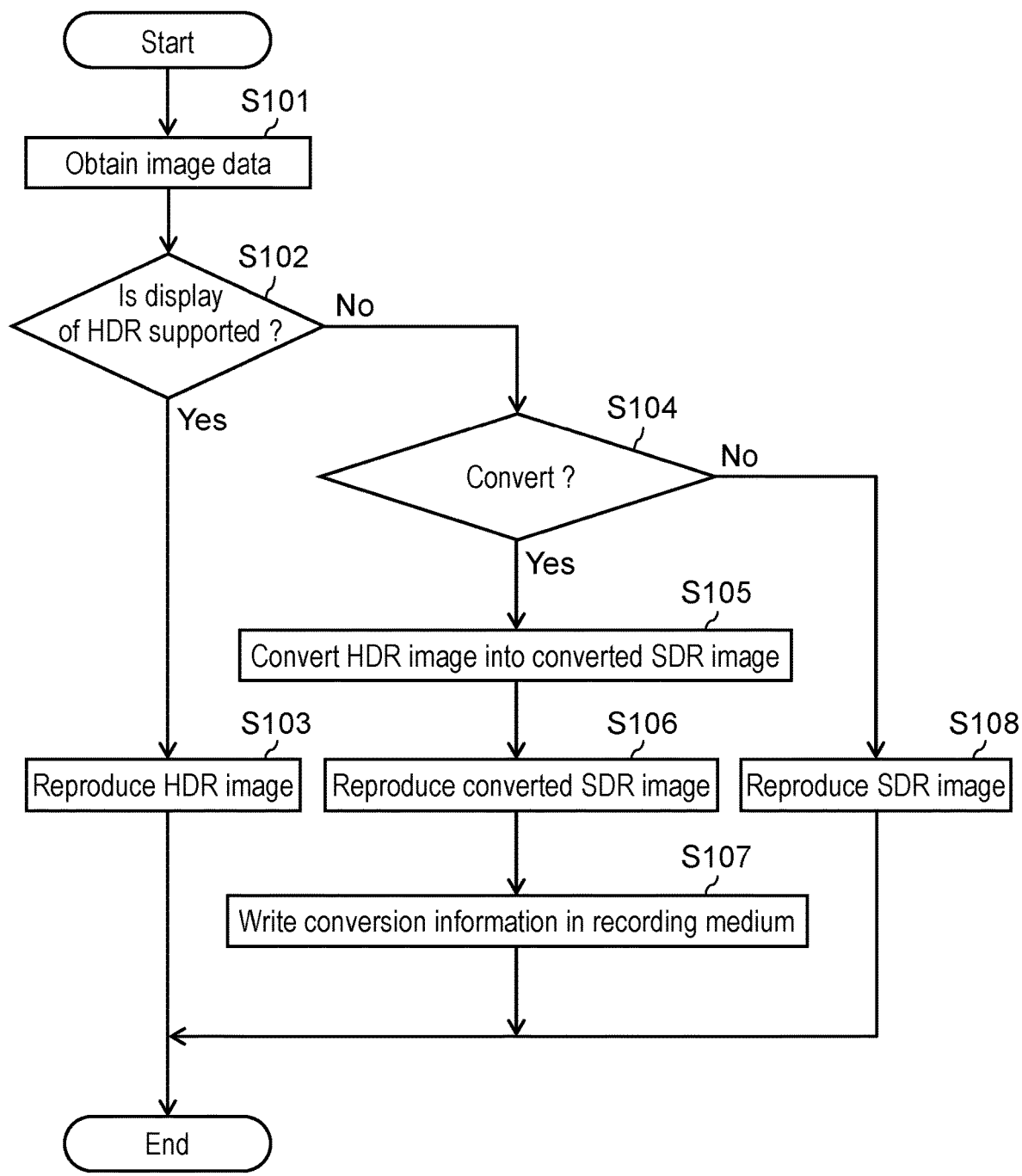
FIG. 5 is a flowchart illustrating an example of reproduction processing of the reproduction device according to the first exemplary embodiment.

FIG. 5 is a flowchart illustrating an example of a reproduction operation of reproduction device 103 according to the first exemplary embodiment.

In addition, an example of an operation of displaying one of HDR image 112, SDR image 113 and converted SDR image 132 on display device 104 will be described with reference to a flowchart in FIG. 6.

Obtaining unit 141 obtains image data 111 including HDR image 112, SDR image 113 and conversion determination information 114 (step S101).

Next, determining unit 142 determines whether or not display device 104 can display HDR image 112 (step S102). That is, determining unit 142 determines in step S102 whether or not display device 104 supports displaying HDR image 112 (whether or not display device 104 has a function of displaying HDR image 112). When receiving from display device 104, for example, a signal (indicated by a broken line in FIG. 4) indicating that display device 104 can display HDR image 112, determining unit 142 determines that display device 104 can display HDR image 112. When determining unit 142 cannot receive from display device 104 the signal indicating that display device 104 can display HDR image 112 or display device 104 cannot display HDR image 112 (supports only SDR image 113), for example, determining unit 142 determines that display device 104 cannot display HDR image 112. Alternatively, a user who uses reproduction device 103 may set to reproduction device 103 to determine whether or not display device 104 can display HDR image 112.

When determining unit 142 determines in step S102 that display device 104 can display HDR image 112 (Yes in step S102), reproducer 144 reproduces HDR image 112 (step S103).

When determining unit 142 determines in step S102 that display device 104 cannot display HDR image 112 (No in step S102) (in other words, display device 104 supports only displaying SDR image 113), determining unit 142 determines whether or not to perform conversion for generating converted SDR image 132 from HDR image 112 by using conversion determination information 114 (step S104).

When determining unit 142 determines in step S104 to convert HDR image 112 into converted SDR image 132 (to generate converted SDR image 132 from HDR image 112) (Yes in step S104), converter 143 generates converted SDR image 132 from HDR image 112 (step S105).

Furthermore, reproducer 144 reproduces generated converted SDR image 132 (step S106).

Write-out unit 145 writes in recording medium 102 additional data 133 such as the parameter used to generate converted SDR image 132 (step S107).

When determining unit 142 determines in step S104 not to convert HDR image 112 into converted SDR image 132 (not to generate converted SDR image 132) (No in step S104), reproducer 144 does not convert HDR image 112 into converted SDR image 132, and reproduces SDR image 113 obtained in step S101 (step S108).

Furthermore, the image reproduced in step S103, step S106 or step S108 is displayed on display device 104.

As described above, when reproducing an SDR image, reproduction device 103 can determine whether to reproduce SDR image 113 as is or to generate converted SDR image 132 from HDR image 112 and reproduce generated converted SDR image 132 by using conversion determination information 114. Consequently, reproduction device 103 can reproduce a suitable image to be displayed on display device 104 connected to reproduction device 103 according to characteristics of obtained SDR image 113 or characteristics of display device 104.

In addition, reproduction device 103 records the parameter used for conversion processing in step S105, in recording medium 102 in step S107. Consequently, when displaying image data 111 on display device 104 again, reproduction device 103 can reduce a processing amount of processing of converting HDR image 112 into converted SDR image 132, and consequently reduce a time taken by this processing. In addition, this parameter may be stored in header 112A or header 113A or may be recorded in an independent region of recording medium 102.

In addition, reproduction device 103 may record converted SDR image 132 in recording medium 102 instead of recording the parameter in recording medium 102 in step S107. In this case, converted SDR image 132 may be recorded in a region different from SDR image 113 in recording medium 102 (i.e., SDR image 113 and converted SDR image 132 may be recorded in recording medium 102). Alternatively, converted SDR image 132 may be overwritten on a region in which SDR image 113 is recorded (i.e., SDR image 113 may be deleted from recording medium 102, and converted SDR image 132 may be recorded instead of SDR image 113).

In addition, reproduction device 103 may record the above parameter, and, in addition, a parameter during reproduction or output, user setting information (effect, etc.) during reproduction, or information of display device 104 connected to reproduction device 103 in recording medium 102.

Next, a specific example of determination processing in step S104 will be described.

First, the specific example of conversion determination information 114 will be described.

FIG. 6 is a view schematically illustrating a configuration example of conversion determination information 114 according to the first exemplary embodiment. In addition, conversion determination information 114 may include at least part of the information illustrated in FIG. 6.

As illustrated in FIG. 6, conversion determination information 114 includes, for example, HDR image information 114A and SDR image information 114B. HDR image information 114A is included in, for example, header 112A of HDR image 112.

HDR image information 114A may include information related to the luminance range (dynamic range) of HDR image 112. More specifically, HDR image information 114A may include information indicating a luminance in an image (a maximum luminance or a center luminance, etc.) or a luminance range (dynamic range).

Furthermore, HDR image information 114A may include information related to shooting for generating HDR image 112, or information related to generation of HDR image 112. HDR image information 114A may include information indicating, for example, a shooting mode (a portrait, a firework, or a night scene, etc.) for performing shooting, a priority luminance range, a view angle of HDR image 112, or shooting parameters for performing shooting. The shooting parameters include a shutter speed, an aperture (F number), an ISO speed, a photometry mode, whether or not a flash is used, an exposure correction step value, and a focal distance. In addition, HDR image information 114A may include at least one of information indicating a shooting date, a manufacturer name of a shooting device, a model name of the shooting device, a resolution of an entire image, resolutions in units of horizontal and vertical directions, a shooting direction, and a color space.

In addition, the priority luminance range indicates a luminance range prioritized for HDR image 112 (a luminance range to which more bits are allocated). The priority luminance range is, for example, a flag indicating whether a picture has been made by prioritizing a high luminance region or has been made by prioritizing a low luminance region. In addition, this information may be information indicating a luminance range (a high luminance or a low luminance) to be prioritized. Furthermore, this information may be a parameter (HDR-ETOF, etc.) used to generate HDR image 112. Furthermore, this information may be automatically determined according to a shooting mode, or may be set by the user during image editing.

SDR image information 114B is information related to SDR image 113. SDR image information 114B is included in, for example, header 113A of SDR image 113. SDR image information 114B may include, for example, at least one of a view angle of SDR image 113, a conversion parameter (SDR-EOTF, etc.) used to generate SDR image 113, and generating device information indicating a device that has generated SDR image 113.

Next, a plurality of specific examples of determination processing executed by determining unit 142 in step S104 will be described with reference to FIGS. 7 to 9.

Figure 7:
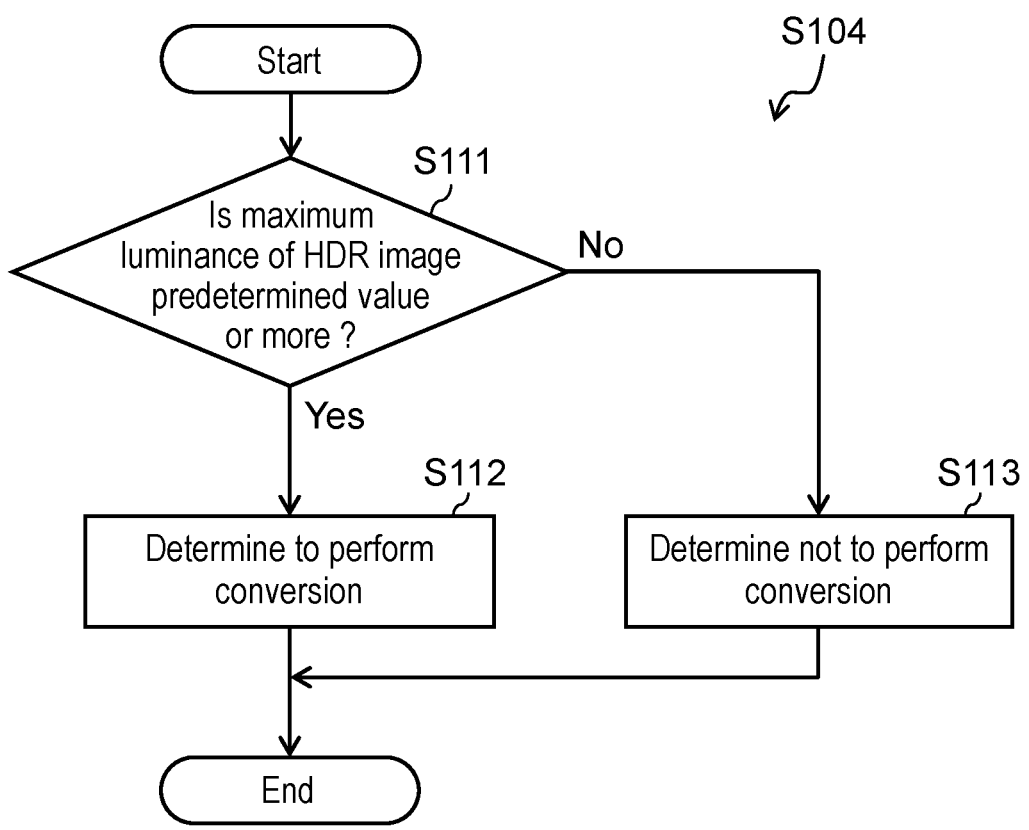
FIG. 7 is a flowchart illustrating an example of determination processing according to the first exemplary embodiment.

FIG. 7 is a flowchart illustrating an example of the determination processing according to the first exemplary embodiment.

In an operation example illustrated in FIG. 7, determining unit 142 determines whether or not a maximum luminance of HDR image 112 is a predetermined value (e.g., 100 nit) or more (step S111).

When determining in step S111 that the maximum luminance of HDR image 112 is the predetermined value or more (Yes in step S111), determining unit 142 determines to convert HDR image 112 into converted SDR image 132 (step S112).

When determining in step S111 that the maximum luminance of HDR image 112 is less than the predetermined value (No in step S111), determining unit 142 determines not to convert HDR image 112 into converted SDR image 132 (step S113).

This processing will be described. When the maximum luminance of HDR image 112 is less than 100 nit covered by SDR image 113, converting HDR image 112 into converted SDR image 132 is less likely to improve image quality of an image displayed on display device 104 that does not support displaying HDR image 112. However, when the maximum luminance of HDR image 112 is 100 nit or more, converting HDR image 112 into converted SDR image 132 is likely to improve image quality of the image displayed on display device 104 compared to a case where SDR image 113 is displayed on display device 104 as is. That is, it is likely that a more suitable image to be displayed on display device 104 can be generated. Consequently, determining unit 142 performs the determination processing illustrated in the flowchart in FIG. 7, so that it is possible to display a more suitable image on display device 104 that does not support displaying HDR image 112.

In addition, a priority luminance range included in HDR image information 114A may be used for conversion processing of converter 143. Consequently, converter 143 can generate converted SDR image 132 that reflects a creator's intention of HDR image 112.

Next, another specific example of the determination processing executed by determining unit 142 in step S104 will be described with reference to FIG. 8.

Figure 8:
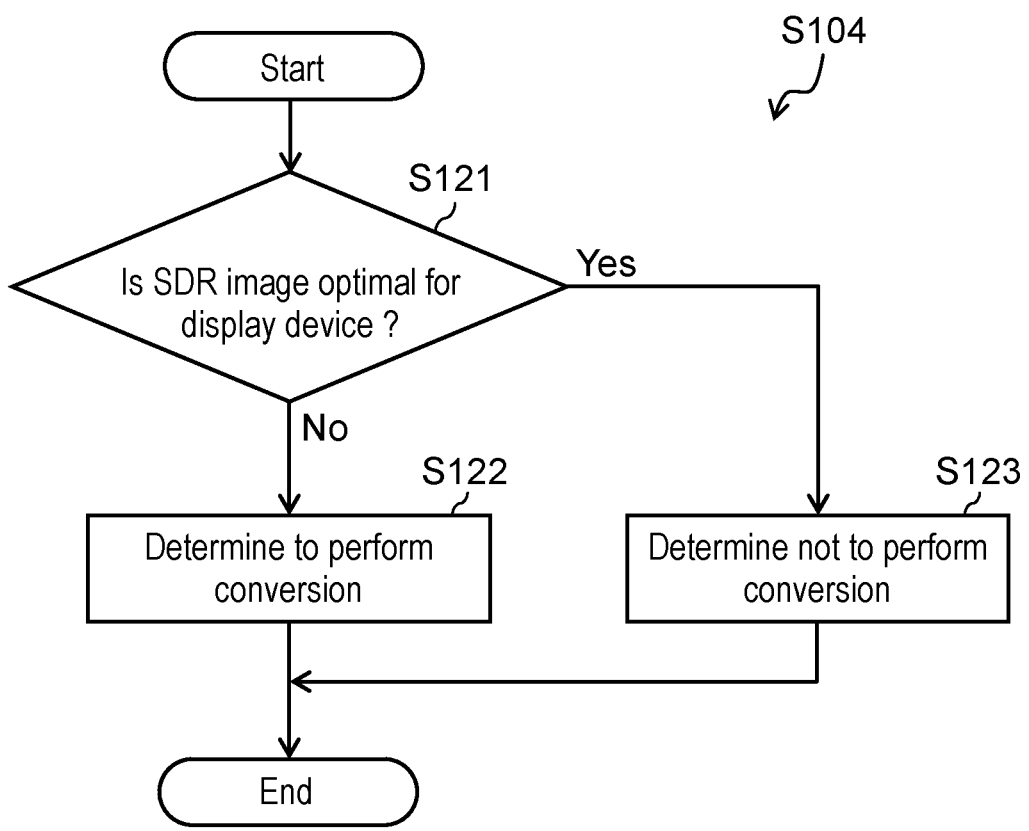
FIG. 8 is a flowchart illustrating another example of the determination processing according to the first exemplary embodiment.

FIG. 8 is a flowchart illustrating another example of the determination processing according to the first exemplary embodiment.

In an operation example illustrated in FIG. 8, determining unit 142 determines whether or not SDR image 113 is optimal for display device 104 (step S121). More specifically, determining unit 142 determines whether or not the view angle of SDR image 113 and the view angle of display device 104 match with each other.

When determining in step S121 that SDR image 113 is not optimal for display device 104 (when, for example, the view angle of SDR image 113 does not match with the view angle of display device 104) (No in step S121), determining unit 142 determines to convert HDR image 112 into converted SDR image 132 (step S122). In this case, converter 143 generates converted SDR image 132 that matches with the view angle of display device 104.

When determining in step S121 that SDR image 113 is optimal for display device 104 (when, for example, the view angle of SDR image 113 matches with the view angle of display device 104) (Yes in step S121), determining unit 142 determines not to convert HDR image 112 into converted SDR image 132 (step S123).

In addition, a conversion parameter used to generate SDR image 113 may be used for the determination processing illustrated in the flowchart in FIG. 8. Determining unit 142 can determine whether or not SDR image 113 is optimal for display device 104, based on this conversion parameter and display characteristics of display device 104.

Furthermore, information related to a device that has generated an SDR image may be used for the determining processing illustrated in the flowchart in FIG. 8. More specifically, when the device that has generated the SDR image is reproduction device 103, in other words, when the SDR image is converted SDR image 132 written in recording medium 102 generated from HDR image 112 by reproduction device 103, reproduction device 103 may read and use converted SDR image 132 written in recording medium 102 without converting HDR image 112 into converted SDR image 132 again. Furthermore, when this is not the case (when, for example, the device that has generated the SDR image is generating device 101), HDR image 112 may be converted into converted SDR image 132.

As described above, according to the determination processing illustrated in the flowchart in FIG. 8, reproduction device 103 determines whether or not it is likely that a more suitable SDR image to be displayed on display device 104 that does not support displaying HDR image 112 can be generated, based on conversion determination information 114 and characteristics of display device 104. Consequently, reproduction device 103 can reproduce the image suitable for display device 104 that does not support displaying HDR image 112.

In addition, reproduction device 103 may determine whether or not to convert HDR image 112 into converted SDR image 132 based only the characteristics of display device 104.

Next, still another specific example of the determination processing executed by determining unit 142 in step S104 will be described with reference to FIG. 9.

Figure 9:
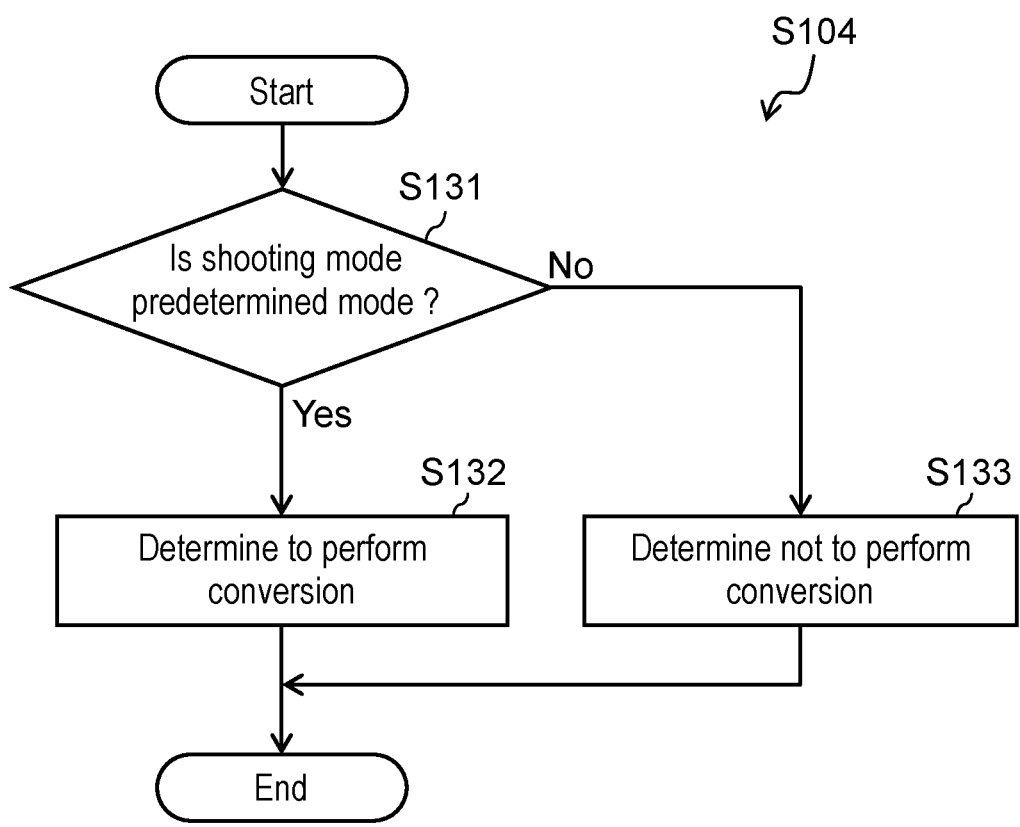
FIG. 9 is a flowchart illustrating still another example of the determination processing according to the first exemplary embodiment.

FIG. 9 is a flowchart illustrating the still another example of the determination processing according to the first exemplary embodiment.

In an operation example illustrated in FIG. 9, determining unit 142 determines whether or not the shooting mode for performing shooting to generate HDR image 112 is a predetermined shooting mode (step S131).

When determining in step S131 that the shooting mode is the predetermined shooting mode (Yes in step S131), determining unit 142 determines to convert HDR image 112 into converted SDR image 132 (step S132).

When determining in step S131 that the shooting mode is not the predetermined shooting mode (No in step S131), determining unit 142 determines not to convert HDR image 112 into converted SDR image 132 (step S133).

In addition, the predetermined shooting mode is a shooting mode that is likely to show a difference in a luminance or a color gamut, and is a "night scene" shooting mode, for example. Thus, an image that is likely to show an influence of a luminance or the like is converted from HDR image 112 into converted SDR image 132. Consequently, it is possible to generate a more suitable image to be displayed on display device 104 that does not support displaying HDR image 112. Consequently, determining unit 142 performs the determination processing illustrated in the flowchart in FIG. 9, so that reproduction device 103 can reproduce a more suitable image on display device 104 that does not support displaying HDR image 112.

Next, an operation example of generating device 101 will be described.

Figure 10:
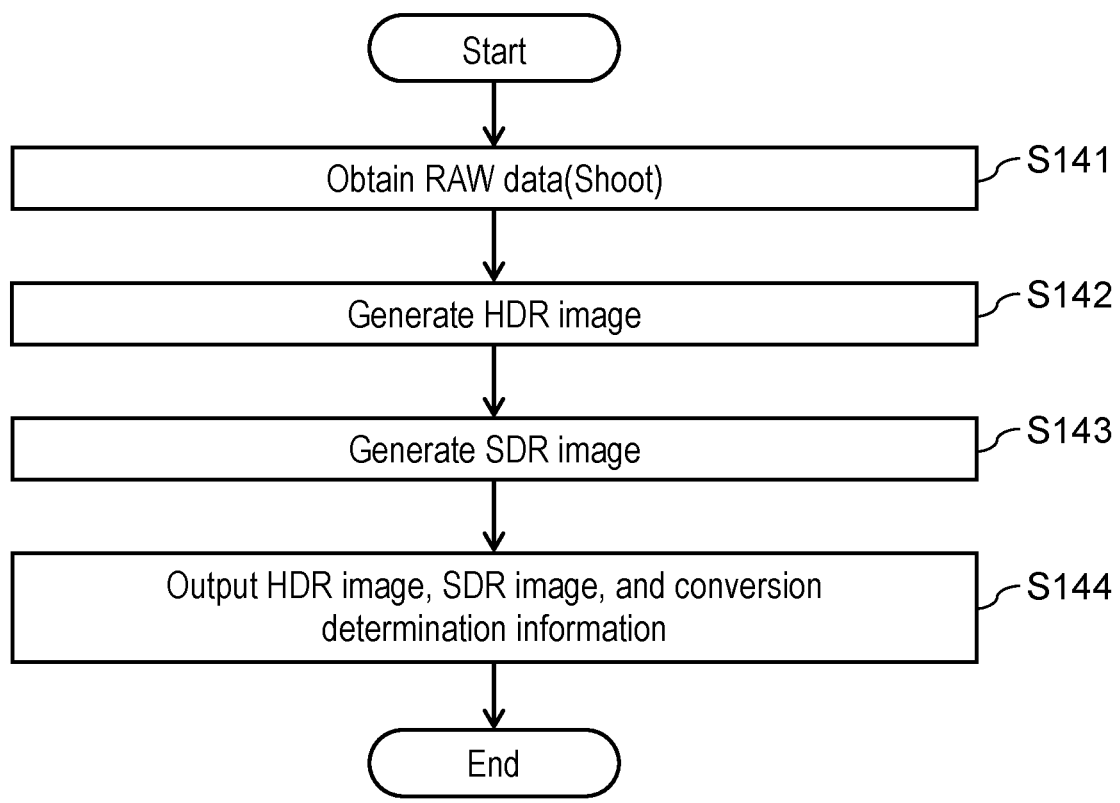
FIG. 10 is a flowchart illustrating an example of image data generation processing of the generating device according to the first exemplary embodiment.

FIG. 10 is a flowchart illustrating an example of image data generation processing of generating device 101 according to the first exemplary embodiment.

RAW image obtaining unit 121 obtains RAW data 131 that is a still image (step S141). RAW data 131 may be obtained by, for example, being shot by generating device 101 that is a shooting device.

HDR image generator 122 performs color correction or the like on RAW data 131 to generate HDR image 112 (step S142).

SDR image generator 123 generates SDR image 113 from RAW data 131 (step S143).

Output unit 124 outputs HDR image 112, SDR image 113, and conversion determination information 114 (step S144).

In addition, conversion determination information 114 is the above-described information, and is generated by at least one of RAW image obtaining unit 121, HDR image generator 122 and SDR image generator 123.

As described above, generating device 101 generates image data 111 including conversion determination information 114. Consequently, reproduction device 103 can appropriately determine whether to reproduce SDR image 113 or to generate converted SDR image 132 from HDR image 112 and reproduce generated converted SDR image 132 by using conversion determination information 114.

1-3. Effects and Others

As described above, the reproducing method according to the present exemplary embodiment is a reproducing method for reproducing an image and outputting the reproduced image to the display device. This reproducing method includes: an obtaining step of obtaining a high quality image and a first low quality image that are still images showing an identical scene, and conversion determination information; a first determining step of determining whether or not the display device can display the high quality image; a first reproducing step of reproducing the high quality image when the display device can display the high quality image; a second determining step of determining whether or not to generate a second low quality image by using the conversion determination information when the display device cannot display the high quality image; a second reproducing step of reproducing the first low quality image when it is determined not to generate the second low quality image; and a third reproducing step of generating the second low quality image from the high quality image and reproducing the second low quality image when it is determined to generate the second low quality image.

In this regard, display device 104 may be an example of the display device. HDR image 112 is an example of the high quality image. SDR image 113 is an example of the first low quality image. Conversion determination information 114 is an example of the conversion determination information. Converted SDR image 132 is an example of the second low quality image. Step S101 is an example of the obtaining step. Step S102 is an example of the first determining step. Step S103 is an example of the first reproducing step. Step S104 is an example of the second determining step. Step S108 is an example of the second reproducing step. Step S105 and step S106 are examples of the third reproducing step.

For example, the reproducing method exemplified in the first exemplary embodiment is the reproducing method for reproducing an image and outputting the reproduced image to display device 104. This reproducing method includes: step S101 of obtaining HDR image 112 and SDR image 113 that are still images showing an identical scene, and conversion determination information 114; step S102 of determining whether or not display device 104 can display HDR image 112; step S103 of reproducing HDR image 112 when display device 104 can display HDR image 112; step S104 of determining whether or not to generate converted SDR image 132 by using conversion determination information 114 when display device 104 cannot display HDR image 112; step S108 of reproducing SDR image 113 when it is determined not to generate converted SDR image 132; and step S105 and step S106 of generating converted SDR image 132 from HDR image 112 and reproducing converted SDR image 132 when it is determined to generate converted SDR image 132.

According to this reproducing method, it is possible to determine whether to generate SDR image 113 as is or to generate converted SDR image 132 from HDR image 112 and reproduce converted SDR image 132 by using conversion determination information 114 when display device 104 cannot display HDR image 112. Consequently, according to the reproducing method, it is possible to reproduce a suitable image on display device 104 that displays the reproduced image.

In the reproducing method, the conversion determination information may be information related to a luminance range of the high quality image.

For example, in the example described in the first exemplary embodiment, according to the reproducing method, conversion determination information 114 may be information related to a luminance range of HDR image 112.

According to this reproducing method, it is possible to determine whether or not to reproduce converted SDR image 132 based on the luminance range of HDR image 112.

In the reproducing method, the conversion determination information may be information of the first low quality image. In the second determining step, whether or not to generate the second low quality image may be determined based on the conversion determination information and capability of the display device.

For example, in the example described in the first exemplary embodiment, according to the reproducing method, conversion determination information 114 may be information of SDR image 113. In step S104, whether or not to generate converted SDR image 132 may be determined based on the conversion determination information 114 and the capability of the display device 104.

According to this reproducing method, it is possible to determine whether or not to reproduce converted SDR image 132 based on information of SDR image 113.

In the reproducing method, the conversion determination information may be a parameter used to generate the first low quality image.

For example, in the example described in the first exemplary embodiment, according to the reproducing method, conversion determination information 114 may be a parameter used to generate SDR image 113.

According to this reproducing method, it is possible to determine whether or not to reproduce converted SDR image 132 based on the parameter used to generate SDR image 113.

In the reproducing method, the conversion determination information may be information related to shooting of the high quality image.

For example, in the example described in the first exemplary embodiment, according to the reproducing method, conversion determination information 114 may be information related to shooting during obtaining of RAW data 131 used to generate HDR image 112.

According to this reproducing method, it is possible to determine whether or not to reproduce converted SDR image 132 based on the information related to shooting to generate HDR image 112.

According to the reproducing method, the conversion determination information may indicate a shooting mode used to shoot the high quality image. In the second determining step, it may be determined to generate the second low quality image when the shooting mode is a predetermined shooting mode.

In this regard, the "night scene" shooting mode is an example of the predetermined shooting mode.

For example, in the example described in the first exemplary embodiment, according to the reproducing method, conversion determination information 114 may indicate the shooting mode used for shooting during obtaining of RAW data 131 used to generate HDR image 112. In step S104, it may be determined to generate converted SDR image 132 when the shooting mode is the "night scene" shooting mode.

According to this reproducing method, it is possible to determine whether or not to reproduce converted SDR image 132 based on the shooting mode used for shooting to generate HDR image 112.

The reproducing method may further include a writing step of writing in a recording medium a parameter used to generate the second low quality image when it is determined to generate the second low quality image.

In addition, recording medium 102 is an example of a recording medium. Step S107 is an example of the writing step.

For example, in the example described in the first exemplary embodiment, the reproducing method may further include step S107 of writing in recording medium 102 a parameter used to generate converted SDR image 132 when it is determined to generate converted SDR image 132.

According to this reproducing method, a processing amount for reproducing converted SDR image 132 again can be reduced.

According to the present exemplary embodiment, the generating method includes: an obtaining step of obtaining RAW data; a first generating step of generating a high quality image that is a still image from the RAW data; a second generating step of generating from the RAW data a first low quality image showing a scene identical to a scene shown by the high quality image; and an outputting step of outputting the high quality image and the first low quality image, and outputting conversion determination information used by a reproduction device to determine whether the reproduction device (1) reproduces the first low quality image or (2) generates a second low quality image from the high quality image and reproduces the second low quality image when a display device connected to the reproduction device cannot display the high quality image.

In this regard, reproduction device 103 is an example of the reproduction device. RAW data 131 is an example of the RAW data. Step S141 is an example of the obtaining step. Step S142 is an example of the first generating step. Step S143 is an example of the second generating step. Step S144 is an example of the outputting step.

For example, in the example described in the first exemplary embodiment, the generating method includes: step S141 of obtaining RAW data 131; step S142 of generating HDR image 112 that is a still image from RAW data 131; step S143 of generating from RAW data 131 SDR image 113 that shows a scene identical to a scene of HDR image 112, and step 144 of outputting HDR image 112 and SDR image 113, and outputting conversion determination information 114 used by reproduction device 103 to determine whether reproduction device 103 (1) reproduces SDR image 113 or (2) generates converted SDR image 132 from HDR image 112 and reproduces converted SDR image 132 when display device 104 connected to reproduction device 103 cannot display HDR image 112.

According to this generating method, HDR image 112, SDR image 113 and conversion determination information 114 are output. Consequently, reproduction device 103 that has obtained these images and the information can determine whether to reproduce SDR image 113 as is or to generate converted SDR image 132 from HDR image 112 and reproduce converted SDR image 132 by using conversion determination information 114 when display device 104 connected to reproduction device 103 cannot display HDR image 112. Consequently, reproduction device 103 can reproduce suitable images on display device 104 connected to reproduction device 103.

In the generating method, the conversion determination information may be information related to the luminance range of the high quality image.

For example, in the example described in the first exemplary embodiment, according to the generating method, conversion determination information 114 may be information related to the luminance range of HDR image 112.

According to this generating method, reproduction device 103 that has obtained conversion determination information 114 can determine whether or not to reproduce converted SDR image 132 based on the luminance range of HDR image 112.

In the generating method, the conversion determination information may be information of the first low quality image.

For example, in the example described in the first exemplary embodiment, according to the generating method, conversion determination information 114 may be information of SDR image 113.

According to this generating method, reproduction device 103 that has obtained conversion determination information 114 can determine whether or not to reproduce converted SDR image 132 based on the information of SDR image 113.

In the generating method, the conversion determination information may be a parameter used to generate the first low quality image.

For example, in the example described in the first exemplary embodiment, according to the generating method, conversion determination information 114 may be a parameter used to generate SDR image 113.

According to this generating method, reproduction device 103 that has obtained conversion determination information 114 can determine whether or not to reproduce converted SDR image 132 based on the parameter used to generate SDR image 113.

In the generating method, the conversion determination information may be information related to shooting of the high quality image.

For example, in the example described in the first exemplary embodiment, according to the generating method, conversion determination information 114 may be information related to shooting during obtaining of RAW data 131 used to generate HDR image 112.

According to this generating method, reproduction device 103 that has obtained conversion determination information 114 can determine whether or not to reproduce converted SDR image 132 based on the information related to shooting to generate HDR image 112.

In the generating method, the conversion determination information may indicate a shooting mode used to shoot the high quality image.

For example, in the example described in the first exemplary embodiment, according to the generating method, conversion determination information 114 may indicate the shooting mode used for shooting during obtaining of RAW data 131 used to generate HDR image 112.

According to this generating method, reproduction device 103 that has obtained conversion determination information 114 can determine whether or not to reproduce converted SDR image 132 based on the shooting mode used for shooting to generate HDR image 112.

According to the present exemplary embodiment, the reproduction device is a reproduction device that reproduces an image and outputs the reproduced image to a display device. This reproduction device includes: an obtaining unit that obtains a high quality image and a first low quality image that are still images showing an identical scene, and conversion determination information; a determining unit that determines whether or not the display device can display the high quality image, and determines whether or not to generate a second low quality image by using the conversion determination information when the display device cannot display the high quality image; and a reproducer that (1) reproduces the high quality image when the display device can display the high quality image, (2) reproduces the first low quality image when it is determined not to generate the second low quality image, and (3) generates the second low quality image from the high quality image and reproduces the second low quality image when it is determined to generate the second low quality image.

In this regard, obtaining unit 141 is an example of the obtaining unit. Determining unit 142 is an example of the determining unit. Reproducer 144 is an example of the reproducer.

For example, in the example described in the first exemplary embodiment, reproduction device 103 reproduces an image and outputs the reproduced image to display device 104. Reproduction device 103 includes: obtaining unit 141 that obtains HDR image 112 and SDR image 113 that are still images showing an identical scene, and conversion determination information 114; determining unit 142 that determines whether or not display device 104 can display HDR image 112, and determines whether or not to generate converted SDR image 132 by using conversion determination information 114 when display device 104 cannot display HDR image 112; and reproducer 144 that (1) reproduces HDR image 112 when display device 104 can display HDR image 112, (2) reproduces SDR image 113 when it is determined not to generate converted SDR image 132, and (3) generates converted SDR image 132 from HDR image 112 and reproduces converted SDR image 132 when it is determined to generate converted SDR image 132.

According to this configuration, reproduction device 103 can determine whether or not display device 104 connected to reproduction device 103 can display HDR image 112, and determine whether to reproduce SDR image 113 as is or to generate converted SDR image 132 from HDR image 112 and reproduce converted SDR image 132 by using conversion determination information 114 when display device 104 cannot display HDR image 112. Consequently, reproduction device 103 can reproduce suitable images on display device 104 connected to reproduction device 103.

According to the present exemplary embodiment, the generating device includes: an obtaining unit that obtains RAW data; a first generator that generates a high quality image that is a still image from the RAW data; a second generator that generates from the RAW data a first low quality image showing a scene identical to a scene shown by the high quality image; and an output unit that outputs the high quality image and the first low quality image, and outputs conversion determination information used by a reproduction device to determine whether the reproduction device (1) reproduces the first low quality image or (2) generates a second low quality image from the high quality image and reproduces the second low quality image when a display device connected to the reproduction device cannot display the high quality image.

In addition, generating device 101 is an example of the generating device. RAW image obtaining unit 121 is an example of the obtaining unit. HDR image generator 122 is an example of the first generator. SDR image generator 123 is an example of the second generator. Output unit 124 is an example of the output unit.

For example, in the example described in the first exemplary embodiment, generating device 101 includes: RAW image obtaining unit 121 that obtains RAW data 131; HDR image generator 122 that generates HDR image 112 that is a still image from RAW data 131; SDR image generator 123 that generates from RAW data 131 SDR image 113 that shows a scene identical to a scene of HDR image 112, and output unit 124 that outputs HDR image 112 and SDR image 113, and outputs conversion determination information 114 used by reproduction device 103 to determine whether reproduction device 103 (1) reproduces SDR image 113 or (2) generates converted SDR image 132 from HDR image 112 and reproduces converted SDR image 132 when display device 104 connected to reproduction device 103 cannot display HDR image 112.

According to this configuration, generating device 101 outputs HDR image 112, the first low quality image, and conversion determination information 114. Consequently, reproduction device 103 that has obtained these images and the information can determine whether to reproduce SDR image 113 as is or to generate converted SDR image 132 from HDR image 112 and reproduce converted SDR image 132 by using conversion determination information 114 when display device 104 connected to reproduction device 103 cannot display HDR image 112. Consequently, reproduction device 103 can reproduce suitable images on display device 104 connected to reproduction device 103.

According to the present exemplary embodiment, the recording medium has recorded thereon: a high quality image that is a still image; a first low quality image that shows a scene identical to a scene shown by the high quality image; and conversion determination information that is used by a reproduction device to determine whether the reproduction device (1) reproduces the first low quality image or (2) generates a second low quality image from the high quality image and reproduces the second low quality image when a display device connected to the reproduction device cannot display the high quality image.

In this regard, recording media 102, 102A, 102B are examples of the recording medium.

For example, in the example described in the first exemplary embodiment, recording medium 102 has recorded thereon: HDR image 112 that is a still image; SDR image 113 that shows a scene identical to a scene shown by HDR image 112; and conversion determination information 114 that is used by reproduction device 103 to determine whether reproduction device 103 (1) reproduces SDR image 113 or (2) generates converted SDR image 132 from HDR image 112 and reproduces converted SDR image 132 when display device 104 connected to reproduction device 103 cannot display HDR image 112. Alternatively, HDR image 112 and conversion determination information 114 are recorded in recording medium 102A. SDR image 113 is recorded in recording medium 102B.

According to this configuration, HDR image 112, SDR image 113 and conversion determination information 114 are recorded in recording medium 102 (102A, 102B). Consequently, by obtaining these images and the information from recording medium 102 (102A, 102B), reproduction device 103 can determine whether to reproduce SDR image 113 as is or to generate converted SDR image 132 from HDR image 112 and reproduce converted SDR image 132 by using conversion determination information 114 when display device 104 connected to reproduction device 103 cannot display HDR image 112. Consequently, reproduction device 103 can reproduce suitable images on display device 104 connected to reproduction device 103.

According to the present exemplary embodiment, the recording medium according to another aspect has recorded thereon: a high quality image that is a still image; and conversion determination information that is used by a reproduction device to determine whether or not the reproduction device generates a second low quality image from the high quality image and reproduces the second low quality image when a display device connected to the reproduction device cannot display the high quality image.

For example, in the example described in the first exemplary embodiment, recording medium 102 (102A) has recorded thereon: HDR image 112 that is a still image; and conversion determination information 114 that is used by reproduction device 103 to determine whether or not reproduction device 103 generates converted SDR image 132 from HDR image 112 and reproduces converted SDR image 132 when display device 104 connected to reproduction device 103 cannot display HDR image 112.

According to this configuration, HDR image 112 and conversion determination information 114 are recorded in recording medium 102 (102A). Consequently, by obtaining these images and the information from recording medium 102 (102A), reproduction device 103 can determine whether or not to generate converted SDR image 132 from HDR image 112 and reproduce converted SDR image 132 by using conversion determination information 114 when display device 104 connected to reproduction device 103 cannot display HDR image 112. Consequently, reproduction device 103 can reproduce suitable images on display device 104 connected to reproduction device 103.

Another Exemplary Embodiment

The first exemplary embodiment has been described above as an example of the technique disclosed in the present application. However, the technique in the present disclosure is not limited thereto, and can also be applied to exemplary embodiments subjected to alteration, substitution, addition, omission and the like. In addition, new exemplary embodiments can be made by combining constituent elements described in the first exemplary embodiment.

The first exemplary embodiment has described the configuration example where an HDR image and an SDR image are used. However, the present disclosure is not limited to this configuration example. Even when, for example, whether to reproduce the obtained first low quality image as is or to generate the second low quality image from the high quality image and reproduce the second low quality image is switched for the high quality image and the low quality image associated with each other, the same method as the method disclosed in the first exemplary embodiment is applicable.

In addition, in the present disclosure, the high quality image and the low quality image are images showing the same scene (contents). Furthermore, the first exemplary embodiment has described the HDR image and the SDR image as examples of the high quality image and the low quality image. However, the present disclosure is by no means limited to this. The high quality image and the low quality image may be, for example, images whose luminance ranges (dynamic ranges) are different from each other, like the HDR image and the SDR image. Furthermore, the high quality image and the low quality image may be, for example, images of different resolutions, and may be, for example, a UHD (3840×2160 pixels) image and an HD (1920×1080 pixels) image. Furthermore, the high quality image and the low quality image may be, for example, images of different bit depths, and may be, for example, a 10-bit image and an 8-bit image. Furthermore, the high quality image and the low quality image may be, for example, images of different color resolutions, and may be, for example, a 4:4:4 format image and a 4:2:0 format image. Furthermore, the high quality image and the low quality image may be, for example, images of different color gamut sizes (color spaces), may be, for example, an image according to Rec.ITU_R BT2020 and an image according to Rec.ITU_R BT709, or an image according to AdobeRGB and an image according to sRGB. Furthermore, the high quality image and the low quality image may be images obtained by combining a plurality of these images. In addition, the bit depth is a number of quantization bits constituting one pixel (pixel).

In addition, reproduction device 103 and display device 104 may be connected by a cable with each other or may be connected by radio with each other.

In addition, reproduction device 103 described in the first exemplary embodiment or each processor included in generating device 101 may be realized by a large scale integration (LSI) that is an integrated circuit. These processors may be individually integrated as an integrated circuit (IC) of one chip or may be integrated as an IC of one chip to include part or all of the processors.

Each processor is not limited to the LSI or the IC, but may be constructed with a dedicated circuit or a general-purpose processor. Alternatively, each processor may be constructed with a Field Programmable Gate Array (FPGA) in which a circuit configuration can be programmed, or a reconfigurable processor that can reconfigure connection and setting of circuit cells in the LSI.

Each of the constituent elements of the above exemplary embodiments may be constructed with dedicated hardware, or implemented by executing a software program suitable for each constituent element using a processor. A program execution unit such as a central processing unit (CPU) or a processor reads and executes a software program recorded in a recording medium such as a hard disk and a semiconductor memory, whereby each constituent element may be implemented.

In the exemplary embodiments, division of the functional block in the block diagram is only an example. For example, a plurality of functional blocks may be implemented as one functional block, one functional block may be divided into a plurality of functional blocks, or part of the functions may be transferred to another functional block. The functions of a plurality of functional blocks may be processed in parallel or in a time-sharing manner by single piece of hardware or software.

Furthermore, an execution order of each step in the flowcharts illustrated in the drawings in the exemplary embodiments is only an exemplary order. Each step may be executed in order different from the orders described in the exemplary embodiments. Furthermore, part of the above steps may be executed simultaneously (i.e., in parallel) with the other steps.

The present disclosure has described the reproduction device and the generating device according to one or a plurality of aspects based on the exemplary embodiments. However, the present disclosure is not limited to these exemplary embodiments. The exemplary embodiments variously modified from the present exemplary embodiment by one of ordinary skill in the art without departing from the scope of the present disclosure, and exemplary embodiments constructed by combining constituent elements of different exemplary embodiments may be included in the scopes of one or a plurality of aspects.

The constituent elements described in the accompanying drawings and the detailed description include not only the constituent elements essential for solving the problem but also constituent elements that are not essential for solving the problem in order to show the above-described technique. For this reason, even if these unessential constituent elements are described in the accompanying drawings and the detailed description, these unessential constituent elements should not be immediately approved as being essential.

The above exemplary embodiments are intended to be illustrative of the technique of the present disclosure, so that various modifications, replacements, additions, omissions, and others can be made within the scope of the claims or equivalents of the claims.

INDUSTRIAL APPLICABILITY

The present disclosure is applicable to reproduction devices such as recorders, and generating devices such as cameras or editing devices.

REFERENCE MARKS IN THE DRAWINGS 100A, 100B: reproduction system
101: generating device
102, 102A, 102B: recording medium
103: reproduction device
104: display device
111, 111A, 111B: image data
112: HDR image
112A, 113A: header
113: SDR image
114: conversion determination information
114A: HDR image information
114B: SDR image information
121: RAW image obtaining unit
122: HDR image generator
123: SDR image generator
124: output unit
131: RAW data
132: converted SDR image
133: additional data
141: obtaining unit
142: determining unit
143: converter
144: reproducer
145: write-out unit

The invention claimed is:

1. A reproducing method for reproducing an image and outputting the reproduced image to a display device, the reproducing method comprising:
    an obtaining step of obtaining a high quality image and a first low quality image that are still images showing an identical scene, and conversion determination information;
    a first determining step of determining whether or not the display device can display the high quality image;
    a first reproducing step of reproducing the high quality image when the display device can display the high quality image;
    a second determining step of determining whether or not to generate a second low quality image by using the conversion determination information when the display device cannot display the high quality image;
    a second reproducing step of reproducing the first low quality image when the determination of the second determining step is made not to generate the second low quality image; and
    a third reproducing step of generating the second low quality image from the high quality image and reproducing the second low quality image when the determination of the second determining step is made to generate the second low quality image.

2. The reproducing method according to claim 1, wherein the conversion determination information is information related to a luminance range of the high quality image.

3. The reproducing method according to claim 1, wherein the conversion determination information is information of the first low quality image, and
in the second determining step, whether or not to generate the second low quality image is determined based on the conversion determination information and capability of the display device.

4. The reproducing method according to claim 3, wherein the conversion determination information is a parameter used to generate the first low quality image.

5. The reproducing method according to claim 1, wherein the conversion determination information is information related to shooting of the high quality image.

6. The reproducing method according to claim 5, wherein the conversion determination information indicates a shooting mode used to shoot the high quality image, and
in the second determining step, the determination is made to generate the second low quality image when the shooting mode is a predetermined mode.

7. The reproducing method according to claim 1, further comprising a writing step of writing in a recording medium a parameter used to generate the second low quality image when the determination of the second determining step is made to generate the second low quality image.

8. A generating method comprising:
an obtaining step of obtaining RAW data;
a first generating step of generating a high quality image that is a still image from the RAW data;
a second generating step of generating from the RAW data a first low quality image showing a scene identical to a scene shown by the high quality image; and
an outputting step of outputting the high quality image, the first low quality image, and conversion determination information used by a reproduction device to determine whether the reproduction device (1) reproduces the first low quality image or (2) generates a second low quality image from the high quality image and reproduces the second low quality image when a display device connected to the reproduction device cannot display the high quality image.

9. The generating method according to claim 8, wherein the conversion determination information is information related to a luminance range of the high quality image.

10. The generating method according to claim 8, wherein the conversion determination information is information of the first low quality image.

11. The generating method according to claim 10, wherein the conversion determination information is a parameter used to generate the first low quality image.

12. The generating method according to claim 8, wherein the conversion determination information is information related to shooting of the high quality image.

13. The generating method according to claim 12, wherein the conversion determination information indicates a shooting mode used to shoot the high quality image.

14. A reproduction device that reproduces an image and outputs the reproduced image to a display device, the reproduction device comprising:
an obtaining device that obtains a high quality image and a first low quality image that are still images showing an identical scene, and conversion determination information;
a determining device that determines whether or not the display device can display the high quality image, and determines whether or not to generate a second low quality image by using the conversion determination information when the display device cannot display the high quality image; and
a reproducer that (1) reproduces the high quality image when the display device can display the high quality image, (2) reproduces the first low quality image when the determining unit determines not to generate the second low quality image, and (3) generates the second low quality image from the high quality image and reproduces the second low quality image when the determining unit determines to generate the second low quality image.

15. A generating device comprising:
an obtaining device that obtains RAW data;
a first generator that generates a high quality image that is a still image from the RAW data;
a second generator that generates from the RAW data a first low quality image showing a scene identical to a scene shown by the high quality image; and
an output device that outputs the high quality image, the first low quality image, and conversion determination information used by a reproduction device to determine whether the reproduction device (1) reproduces the first low quality image or (2) generates a second low quality image from the high quality image and reproduces the second low quality image when a display device connected to the reproduction device cannot display the high quality image.

16. A recording medium having recorded thereon:
a high quality image that is a still image;
a first low quality image that shows a scene identical to a scene shown by the high quality image; and
conversion determination information that is used by a reproduction device to determine whether the reproduction device (1) reproduces the first low quality image or (2) generates a second low quality image from the high quality image and reproduces the second low quality image when a display device connected to the reproduction device cannot display the high quality image.

17. A recording medium having recorded thereon:
a high quality image that is a still image; and
conversion determination information that is used by a reproduction device to determine whether or not the reproduction device generates a second low quality image from the high quality image and reproduces the second low quality image when a display device connected to the reproduction device cannot display the high quality image.

* * * * *